United States Patent

Hammond, Jr.

[15] 3,681,979
[45] Aug. 8, 1972

[54] COMPLIANCE TESTING APPARATUS

[72] Inventor: Fred H. Hammond, Jr., Wellesley, Mass.

[73] Assignee: The Kendall Company, Walpole, Mass.

[22] Filed: Sept. 18, 1970

[21] Appl. No.: 73,415

[52] U.S. Cl. ............................................. 73/81
[51] Int. Cl. ........................................... G01n 3/42
[58] Field of Search .................. 73/100, 78, 81, 94

[56] References Cited

UNITED STATES PATENTS

| | | | |
|---|---|---|---|
| 2,280,966 | 4/1942 | Nadai et al. | 73/94 |
| 3,559,466 | 2/1971 | Calleson | 73/81 |

*Primary Examiner*—Richard C. Queisser
*Assistant Examiner*—Marvin Smollar
*Attorney*—Martin Kirkpatrick

[57] ABSTRACT

Compliance testing apparatus having a movable test specimen support and a movable indenter probe comprising a balance with variable weight means and displacement measuring means. Actuating means are provided for changing the balance weight. The displacement measuring means carries the indenter probe and provides an electrical displacement signal of the probe from a predetermined position. Driving means are provided for moving the support toward the probe for contact of the test specimen therewith. The apparatus is responsive to movement of the displacement measuring means movable element to the predetermined position to stop movement of the support toward said probe, to change the balance weight to load the indenter probe for movement thereof into said test specimen away from said predetermined position, and preferably to start a timing means, the latter being connected to indicating means to stop the indicating means after the predetermined time has elapsed to indicate the displacement of the probe from the predetermined position and hence the compliance of the test specimen.

6 Claims, 4 Drawing Figures

COMPLIANCE TESTING APPARATUS

This invention relates to an apparatus for measuring the compliance of a wide range of materials.

A variety of devices suitable for measuring hardness of materials is known in the art. Typical are the devices disclosed in U.S. Pat. Nos. 2,682,169 and 3,123,998. The device of the former patent, which measures hardness by a manual method, lacks means for continuously monitoring and measuring compliance. In the apparatus shown in the U.S. Pat. No. 3,123,998, an attempt is made to overcome some of the deficiencies of the standard hardness tester by measuring hardness after a predetermined interval by means of a stop watch. While hardness measurements can be made with these prior art devices, the limited sensitivity of the units proscribes accurate measurement of penetration of the softer materials.

A different approach to measuring hardness of materials is disclosed in U.S. Pat. No. 2,619,831, wherein the time at which a penetration sufficient to lift a given load is measured. Inasmuch as the forces on the test specimen are increasing during the operation, valid measurements are obtained only for materials with time independent hardness such as steel, highly-cured rubbers, etc.

It is a major object of the present invention to provide an automatic compliance measuring apparatus having a high degree of sensitivity, thereby allowing for accurate measurement of compliance of materials ranging from extremely soft to almost rigid materials. Thus, the apparatus of the present invention is particularly useful in the measurement of compliance of a variety of adhesives, plastics, rubber, foams, felts, etc.

The disadvantages inherent in the heretofore known testers have been obviated in the apparatus of the invention, by reason of its measurement of penetration employing an electrical system which is more fully described hereinafter. The force applied to the test specimen is constant during the operation, and penetration can be measured at a pre-selected time. The sensitivity of the apparatus permits measurement of compliance of a wide range of materials, including those having time-dependent compliance characteristics such as viscoelastic materials.

More specifically, the apparatus of the invention has a movable test specimen support and a movable indenter probe with a test specimen contact surface for measuring compliance of a test specimen and comprises balance means having arm means with variable weight means, actuating means for changing the weight of said arm weight means, and displacement measuring means mounted on said arm means. The displacement measuring means has a stationary part and a movable part; the movable part carries said indenter probe and provides an electrical displacement signal of said probe from a predetermined position. Driving means are provided for moving said support toward said probe for contact of said test specimen therewith and movement of said probe to said predetermined position. Also provided are electrically operated indicating means for indicating the displacement of said probe from said predetermined position and preferably timing means for measuring a predetermined time interval. The displacement measuring means is connected to said driving means, actuating means and timing means, if used, responsive to movement of said indenter probe to said predetermined position to stop movement of said support toward said probe, to change the weight of said weight means to load said indenter probe for movement thereof into said test specimen away from said predetermined position and to start said timing means, if used. The displacement measuring means is also connected to said indicating means, through said timing means if used to stop said indicating means after said predetermined time, to indicate the displacement of the probe away from the predetermined position and hence measure the compliance of the test specimen.

For the purpose of more fully explaining further objects and features of the invention, reference is now made to the following detailed description of a preferred embodiment thereof, together with the accompanying drawings, wherein.

Figure 1:
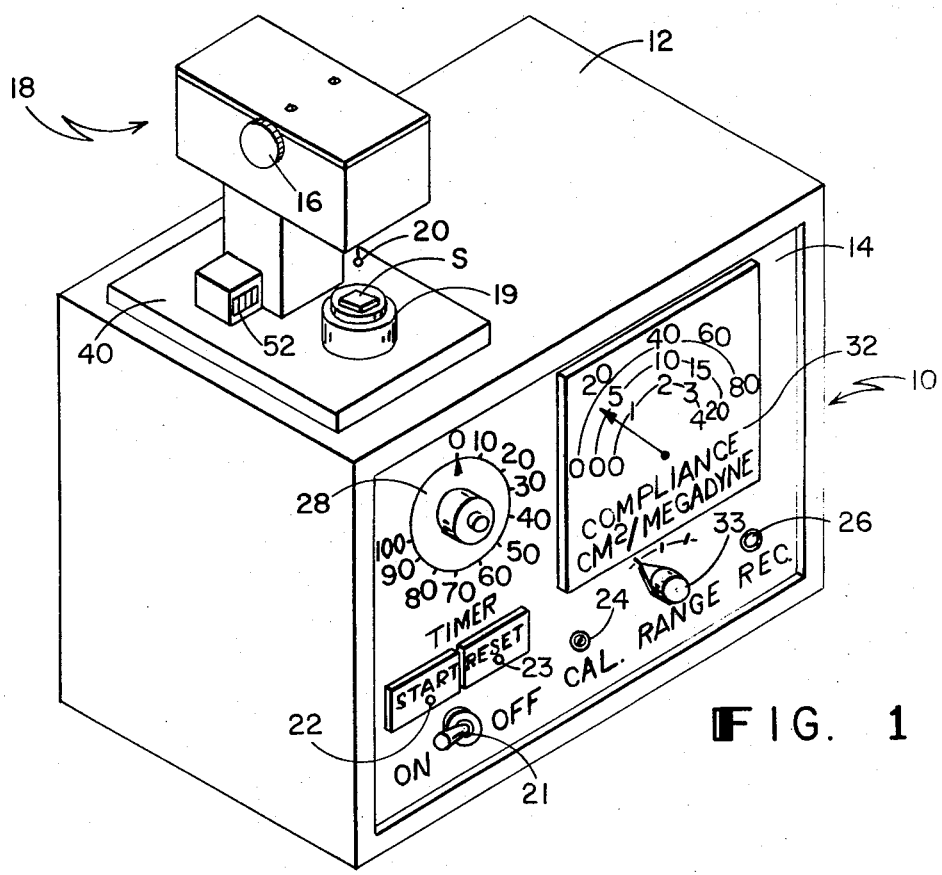
FIG. 1 is an isometric view of the assembled apparatus of the invention.
Figure 2:
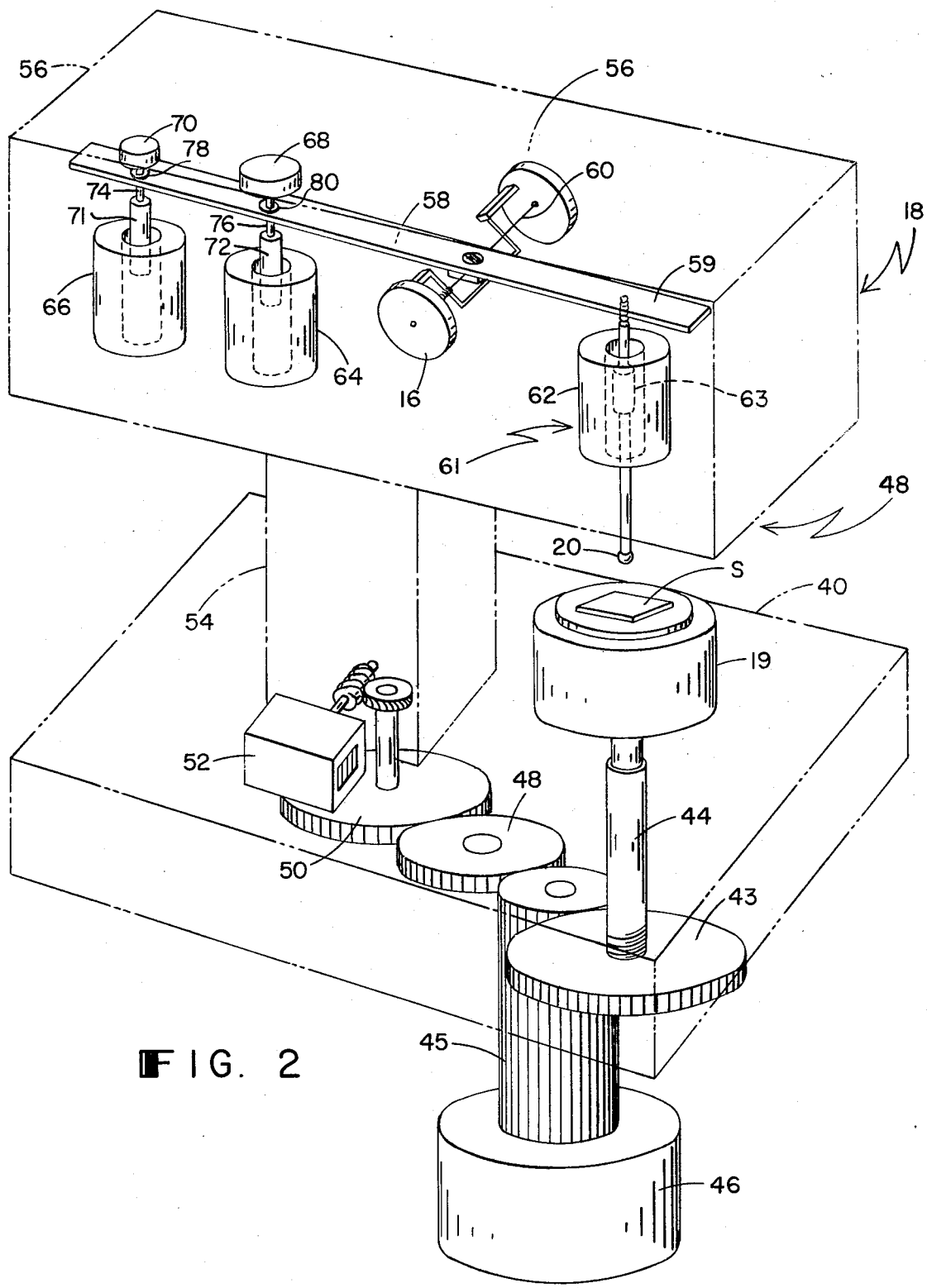
FIG. 2 is an isometric detail view of certain elements of the apparatus of FIG. 1.

Referring to the drawings and particularly to FIG. 1, the apparatus of the invention includes a housing generally designated 10, with a top platform 12 and a front operational panel 14. The mechanical elements of the apparatus are mounted on a removable sub-unit generally designated 18, which unit, which is more fully illustrated in FIG. 2, is set into an aperture in top platform 12. Mounted on sub-unit 18 is an adjusting knob 16 for adjusting torsion in the balance, a vertically movable support 19 for the test specimen S and a movable indenter probe 20 with a test specimen contact surface for measuring compliance of the test specimen.

The front operational panel 14 contains power switch 21, start switch 22 and reset switch 23 for operating the apparatus, as will be described more fully hereinafter. A calibration means 24 and a connection 26 to a time-voltage recording device, if desired, are also provided. The time at which the readings will be made is set by a timer 27 having a setting dial 28, which conveniently measures times of 1 to 100 seconds and an electrically operated indicating meter 32 is provided for reading the compliance of the test specimen. Range switch 33 is provided for meter 32.

FIG. 2 shows the elements of mechanical sub-unit 18 in more detail. It comprises a bottom platform 40 having a vertically movable support 19 for test specimen S including a micrometer screw 44 mounted in a screw threaded bore in platform 40 for vertical axial movement of the support toward probe 20 when rotated by suitable driving means such as support driving motor 46, through gears 43 and 45. Motor 46 is preferably a reversible, synchronous motor with a clutch and brake (not shown). Preferably the apparatus is constructed with a removable mechanical sub-unit 18 to allow measurement of materials in varying environments with the mechanical unit being connected to the electrical system by a cord of appropriate length. Idler gear 48 and drive gear 50 connect motor 46 through its gear 45 with thickness indicator 52 which is used to measure the thickness of the test specimens on movable support 19.

Support post 54 connects bottom platform 40 with top housing 56, in which is mounted a balance beam having opposite arms 58 and 59 supported by a central torsion wire 60. Adjusting knob 16 is preferably adjusted so that there will be no torsion in wire 60 when the displacement measuring device 62 is at the null position as hereinafter described. A minimal initial unbalancing force is preferably applied to insure that the displacement measuring device is always below its null position at the beginning of the test. Indenter probe 20 has a test specimen contact surface made of any hard, inert material. It is suspended from one arm 59 of the balance beam by means of the movable core element 63 of a displacement measuring device 61, herein disclosed as a linear variable differential transformer having stationary coils 62 and providing an electrical displacement signal of said core from a predetermined position, usually a null position. Other devices, such as a capacitance gauge or a variable reluctance transducer could be used as well.

The opposite arm 58 of the balance beam carries variable weight means in the form of removable weights 68 and 70 having electrically operated actuating means shown as solenoids 64 and 66 for changing the weight of balance arm 58 by removing said weights therefrom. While two weights are shown in the drawings, for providing ranges of operation selected by range switch 33, only one is essential to the basic function of the apparatus. While solenoid 66 is deenergized, weight 70 is supported by arm 58 and consequently loads it. When solenoid 66 is energized, core 71 moves upward, thereby moving pin 74 upward through enlarged hole 78; pin 74 lifts weight 70 free of arm 58. Weight 68 is similarly removed by the action of solenoid 64, core 72, and pin 80.

Figure 3:
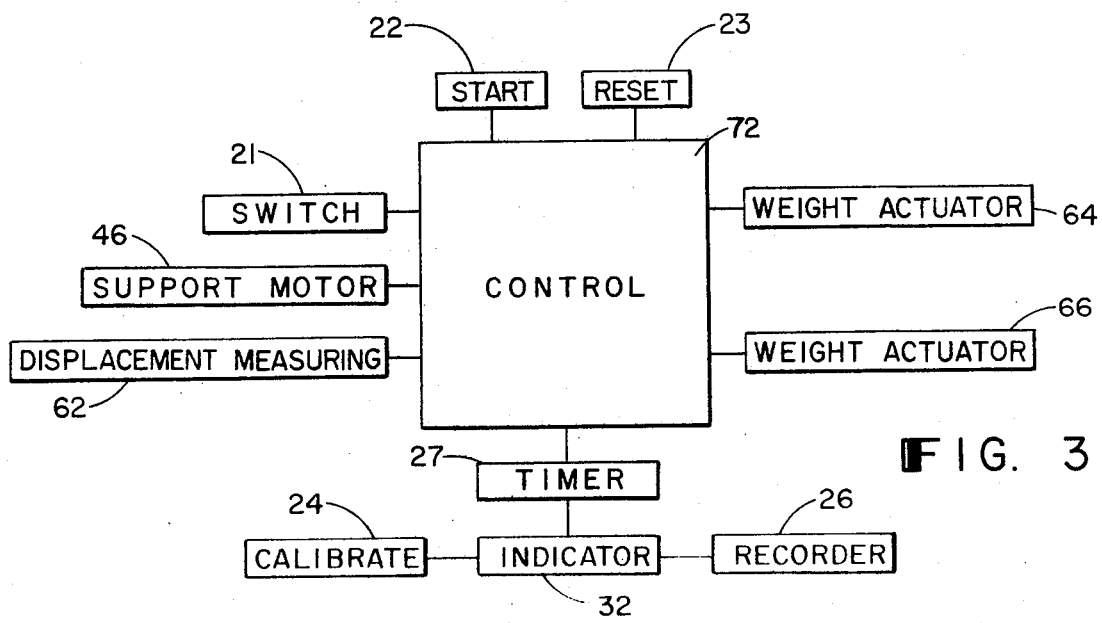
FIGS. 3 and 4 are, respectively, block and circuit diagrams of the apparatus of FIGS. 1 and 2.
Figure 4:
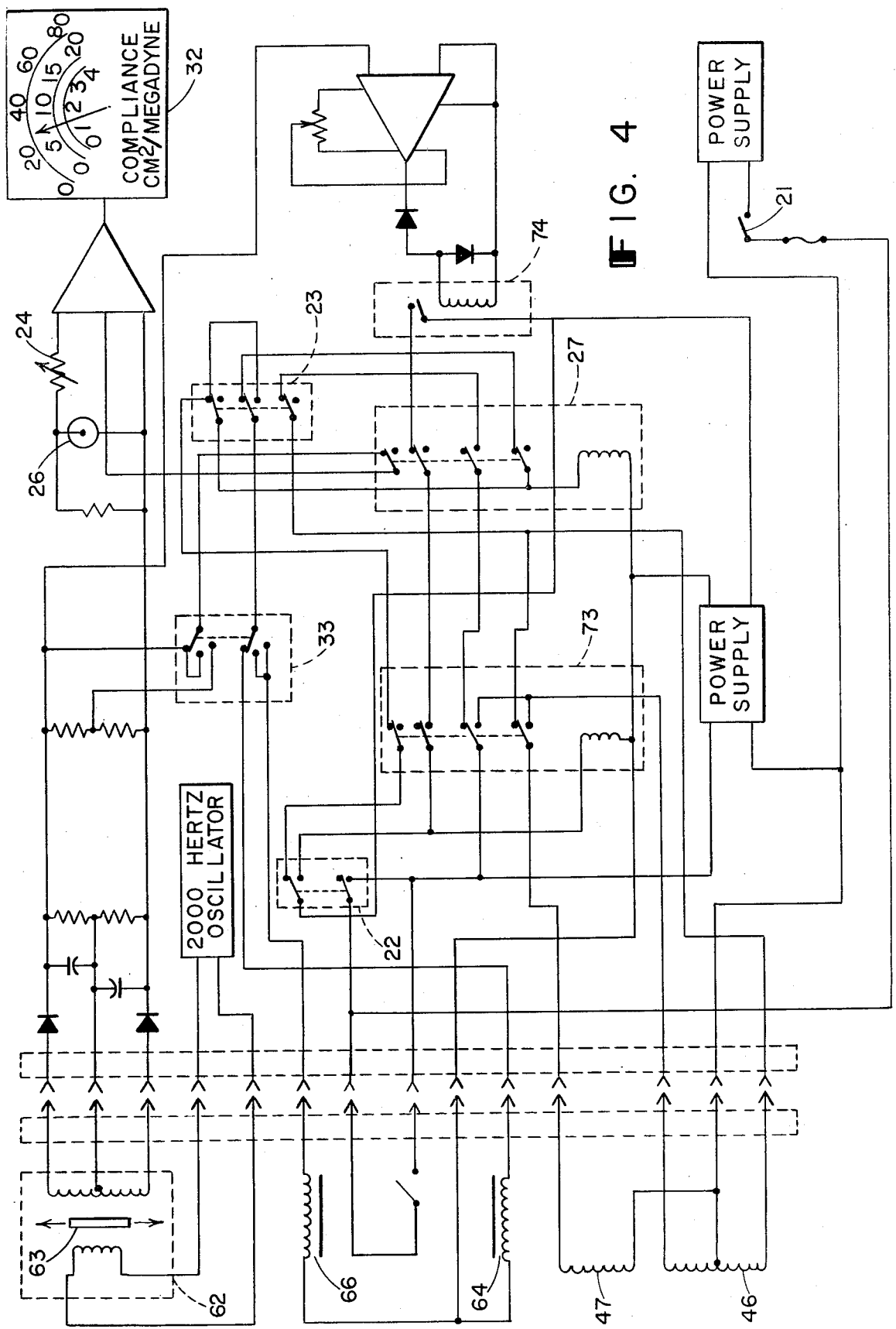

In FIGS. 3 and 4 are shown the electrical elements of the invention all of which are well known and so need not be described in detail. Thus, control element 72, including its relays 73 and 74, is connected to the actuating solenoids 64,66; to the displacement measuring device 61; to the support driving motor 46 and its clutch coil 47 to the indicating meter 32 through range switch 33 and timer 27. The control element 72 and the elements connected to it are responsive to movement of the movable core 63 to its predetermined position upon contact of probe 20 with sample S to stop movement of the support 19 toward probe 20 and to change the weight of the arm by removing weights 68,70 therefrom to load indenter probe 20 for movement thereof into test specimen S, away from said predetermined position, the displacement thereof being indicated on indicating meter 32. At the same time, timer 27 is started, said timer being connected to indicating meter 32 to stop said indicating meter after said predetermined time to maintain its compliance reading until reset. If desired, two timers may be used to indicate two compliance values during a single measurement, with the indicating meter stopping at the first compliance value, remaining stationary until the second is reached, and then moving to and remaining stationary at the second value.

To set up the apparatus, one levels the device so that probe 20 hangs free in a vertical position. Power switch 21 is moved to its ON position and the meter 32 is inspected to ascertain if the indicator is at a reading greater than zero, and for practical purposes, preferably at a point no greater than two-thirds of its full compliance scale range. If knob 16 has been properly adjusted, zero torsion at the null point will provide such a position.

To operate the apparatus of the invention, a sample S having an arbitrary thickness is placed on vertically movable support 19. Preferably the sample is sheeted to provide a flat surface as needed for accurate measurement. With power switch 21 in its ON position, support 19 in its lowered position and timer 27 set to the desired time, start button 22 is actuated and support 19 begins to move upwardly. Support 19 moves up until probe 20 contacts the test specimen S and continues to move up until movable transformer core element 63 is moved to a predetermined position, usually a null position, as measured by the voltage output from the displacement measuring device 61. By designing the apparatus so as to control the rate of movement for support 19 and to provide low initial displacement of movable core element 63, a minimal interval elapses between the time probe 20, contacts test specimen S and the time movable core element 63 reaches its null position. At this latter time, thickness gauge 52 may be used to measure thickness of sample S, such gauge having previously been calibrated by moving the surface of support 19 into contact with probe 20. Also at the time movable core element 63 reaches its null position, control element 72 and range switch 33 energizes one of solenoids 64,66 so that one of weights 68,70 is removed from the opposite arm 58 of the balance beam thereby loading indenter probe 20 by applying a corresponding load to it. The displacement measuring device 61 thereafter continuously measures penetration of the indenter probe 20 into the sample in terms of its displacement from said predetermined position as shown on indicating meter 32. After the preselected period of time set on timer 27 has elapsed, meter 32 will stop and maintain its reading, indicating the compliance of test specimen S. Thereafter, the apparatus may be reset by actuating reset switch 23.

While the invention has been illustrated with respect to an apparatus having a torsion balance, various other balance means can be suitably employed. Thus, a balance arm fulcrumed upon a knife edge, spring suspension systems, etc. could be used.

The apparatus as illustrated herein measures penetration, which is mathematically related to compliance to the well-known Hertz equation, which in simplified form may be written thusly:

$$C=(KP^{3/2})/W$$

wherein $C=$ compliance, $P=$ penetration, $W=$ load on the probe and $K$ is a constant. By means of an appropriately scaled indicating meter, compliance may be read directly on meter 32, on one of the three ranges as determined by range switch 33 which determines which of the two weights 68,70 are utilized and by the electrical sensitivity of the meter. When reporting compliance, it is necessary to state the time at which the measurement was taken, since compliance changes with time. Thus, it is a particular feature of the apparatus of the invention that compliance can be measured at any selected time interval as set by timer 27, or at two intervals if two timers be used.

What is claimed is:

1. Apparatus having a movable test specimen support and a movable indenter probe with a test specimen contact surface for measuring compliance of a test specimen, comprising balance means having rigidly connected arm means with variable weight means actuating means for changing the weight of said arm weight means displacement measuring means having a stationary part and a movable part, said movable part attached to said arm means and carrying said indenter probe and providing an electrical displacement signal of said probe from a predetermined position driving means for moving said support toward said probe for contact of said test specimen therewith and movement of said probe to said predetermined position and electrically operated indicating means for indicating the displacement of said probe from said predetermined position said displacement measuring means, responsive to movement of said indenter probe, being connected to said driving means to stop movement of said support toward said probe and to said actuating means to change the weight of said weight means to load said indenter probe at said predetermined position, said displacement measuring means also being connected to said indicating means to indicate displacement of said probe away from said predetermined position to measure the compliance of said test specimen.

2. Apparatus as claimed in claim 1 wherein said actuating means for changing the weight of said arm weight means is electrically operated.

3. Apparatus as claimed in claim 2 wherein said balance means has opposite arms, with said variable weight means mounted on one of said arms and said displacement measuring means mounted on the other of said arms, and said electrically operated actuating means removes said weight means from said one arm to weight said opposite arm.

4. Apparatus having a movable test specimen support and a movable indenter probe with a test specimen contact surface for measuring compliance of a test specimen, comprising balance means having rigidly connected opposed arm means with variable weight means on one of said opposed arm means electrically operated actuating means for removing the weight of said arm weight means displacement measuring means having a stationary part and a movable part, said movable part attached to the opposite one of said opposed arm means and carrying said indenter probe and providing an electrical displacement signal of said element and probe from a predetermined position driving means for moving said support upwardly toward said probe for contact of said test specimen therewith and subsequent movement of said probe and movable part upwardly to said predetermined position and electrically operated indicating means for indicating the displacement of said movable part and probe from said predetermined position, said displacement measuring means, responsive to movement of said indenter probe, being connected to said driving means to stop said upward movement of said support toward said probe and to said actuating means to change the weight of said weight means to load said indenter probe at said predetermined position, said displacement measuring means also being connected to said indicating means to indicate displacement of said probe away from said predetermined position to measure the compliance of said test specimen.

5. Apparatus as claimed in claim 4 wherein said balance means is a torsion balance.

6. The apparatus of claim 4 including timing means for measuring a predetermined time interval.

* * * * *